Dec. 11, 1962 H. M. FREDERICK 3,067,886
SHEET ITEM HANDLING APPARATUS
Filed Dec. 7, 1959 6 Sheets-Sheet 1

INVENTOR.
HAROLD M. FREDERICK
BY *Carl Fissell Jr.*
AGENT

Fig. 3

Dec. 11, 1962     H. M. FREDERICK     3,067,886
SHEET ITEM HANDLING APPARATUS
Filed Dec. 7, 1959     6 Sheets—Sheet 3

Fig. 4

INVENTOR.
HAROLD M. FREDERICK
BY
*Carl Fissell Jr*
AGENT

Fig. 5

Dec. 11, 1962 H. M. FREDERICK 3,067,886
SHEET ITEM HANDLING APPARATUS
Filed Dec. 7, 1959 6 Sheets-Sheet 5

Fig. 6

INVENTOR.
HAROLD M. FREDERICK
BY
Carl Fissell Jr.
AGENT 3,067,886
SHEET ITEM HANDLING APPARATUS
Harold M. Frederick, Berwyn, Pa., assignor to Burroughs
Corporation, Detroit, Mich., a corporation of Michigan
Filed Dec. 7, 1959, Ser. No. 857,960
11 Claims. (Cl. 214—11)

This invention relates to sheet item handling apparatus and more particularly to apparatus for conveying and sorting record media such as bank checks, deposit slips, and similar documents.

In general, conveying apparatus of the type to which this invention is particularly applicable employs transport chutes extending for considerable distances and usually terminating in separate receptacles or pockets into which the items transported are directed. In apparatus of this kind for sorting bank checks and the like the chutes have been formed of thin elongated blade-like members compactly assembled together in side by side relationship, each adjacent pair of blades being slightly separable from one another to form a chute passage for the sheet items. One end of the chute blades terminate together in a common area and are capable of lateral divergence to form throats for receiving the sheet items for transit along the selected chute. The opposite ends of these chute blades, as previously mentioned, usually terminate in separate receptacles or pockets, each individual to the transport chute to which it relates. It is highly desirable in apparatus of this kind to have ready access to the chutes for inspection, maintenance, and if need be, the repair thereof. Additionally, a problem with respect to sorting apparatus of this kind is the occasional jamming of items in the transport chutes. This usually stops further operation of the apparatus. For these various reasons it is desirable to provide ready and convenient accessibility to the transport chutes, and in the case of a jam, to take quick and effective action to correct this condition and thus minimize the "down time" of the machine.

The illustrated embodiment of the invention herein is generally similar to the apparatus disclosed and claimed in the following copending applications for United States patents all of which are assigned to the same assignee as the present application: Walter Hanstein, Serial No. 732,920, filed May 5, 1958, entitled "Magnetic Selection Apparatus," now abandoned; Charles B. Hebeler, Serial No. 771,851, filed November 4, 1958, entitled "Magnetic Selection Apparatus," now abandoned; and Felice V. Palasciano, Serial No. 816,005, filed May 26, 1959, now Patent No. 3,022,907, entitled "Item Handling Apparatus," of which FIGS. 1 to 8 inclusive correspond substantially to FIGS. 1 to 8 respectively of the accompanying patent drawings.

The present invention employs sheet item transport chutes similar to that disclosed in the aforesaid patent applications and formed of two parallel edge aligned groups of elongated vanes or blades of flexible material separated from one another by a relatively narrow slot running the length thereof. One of the parallel groups of blades is carried by a member which extends from end to end of the blade or vane assemblies and overlies the same in the manner of a lid or cover. Movement of the lid as in raising the same, separates the one group of blades from the other group exposing both groups to view for immediate access thereto. A common end of all the blades of the two groups terminate freely and serve as the entrances to the chutes. The other ends of the two groups of blades terminate at separate item stacking pockets, one associated with each chute, to which the items being handled are conveyed. At the entrance end of the chutes means is provided to selectively separate the chute entrance ends of the blades to designate a chute between a pair of blades as the particular one for transporting the item to a selected pocket. As disclosed, in the hereinabove mentioned patent applications, the provision for separating the blades to form the chute entrances is accomplished by the reaction of magnetic fields established by stationary magnets disposed on opposite sides of the free ends of the blades and individual magnetic fields created by the flow of electrical current through a thin planar type conductive coil disposed on each blade end. One pair of magnetic members is mounted on the under side of the cover or lid aforementioned and thus is movable toward and away from the other pair of magnetic members when the cover is lowered and raised.

In the space or slot separating the blade groups, means is provided for moving the sheet items through the chutes to the pockets such means including endless tapes or belts having opposed portions lying in the slot and driven in the direction of the pockets by power operated rollers or sheave wheels engaged therewith. Yieldingly urging the portions of the driving tape in the slot toward one another are a plurality of confronting pairs of rollers, one roller of each pair being resiliently pressed toward the other with the peripheries of each pair of rollers meeting the driving tapes in the space between the adjacent and aligned edges of the two groups of chute blades.

It is an important object of the invention, therefore, to provide means which gains ready access to the transport chutes for inspection or maintenance purposes or for clearing jams which may occur in the operation of the apparatus.

It is another important object of the invention to provide an improved item transport mechanism having a novel provision for exposing the internal parts thereof to inspection and access.

It is a further important object of the invention to provide an improved construction of sorting apparatus and the like which, upon the simple movement of a cover member of the apparatus, serves to divide the item transport mechanism thereof into two separate sections both readily accessible for inspection, repair and maintenance.

It is still a further important object of the invention to provide an improved housing arrangement for the item transport mechanism of a sorting apparatus which upon the simple movement of the cover member thereof expeditiously discloses the internal working parts of the transport mechanism to view and access.

These and other objects and advantages of the invention will become more apparent to persons skilled in the art from the following description taken together with the accompanying drawings wherein.

Figure 1:
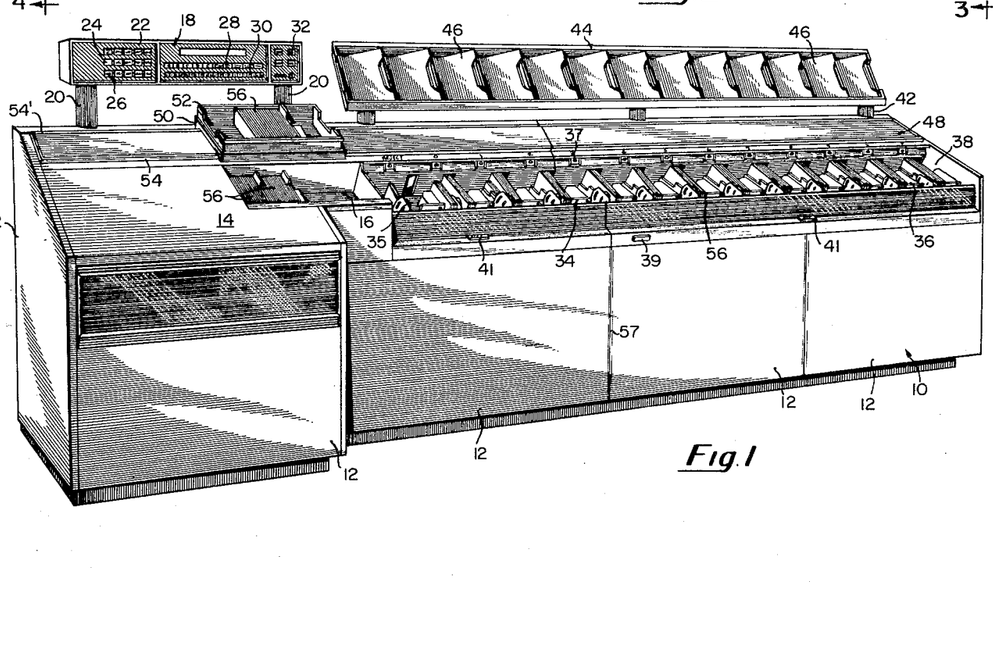
FIG. 1 is a perspective view of an item sorter incorporating a preferred embodiment of the invention.

Referring first to FIG. 1 of the drawings, there is shown a sheet item sorter machine embodying a preferred form of the invention. Generally described, the machine includes a substantially rectangular housing or cabinet hereinafter referred to as the cabinet 10. The cabinet is provided with a number of removable front, side and rear panels, only certain of which, all identified by the common numeral 12, are visible in this figure. The top panel or cover 14 on the upper left side of the cabinet 10 is canted forwardly and downwardly at an angle which in the illustrated embodiment of the invention is approximately 21½° as is the entire top work surface of the machine. This angle provides handling ease and comfort for the operator, as well as convenience and accessibility to component assemblies located both above and below the cover.

An item loading hopper-feeder 16 is disposed in the left end portion of the cabinet. Directly above hopper 16 at the rear of the left end of the cabinet is located an easily accessible and conveniently arranged control panel 18 supported on suitable short posts or pedestals 20. The control panel includes a row of lights 22 for indicating various operating conditions of the machine, a row of operating controls 24 for providing power to the apparatus, another row of comunication lights 26 for additional item handling condition indications, a blank of field selector keys 28 for selecting sorting fields for each item processed by the apparatus, a bank of digit selecting keys 30 for selecting a specific sorting field digit, and a group of operating controls 32 for stopping and resetting the item handling apparatus.

To the right of the loading hopper 16 is located a row of stacker pockets 34 which in the illustrated embodiment of the invention comprise from left to right a reject pocket 35, ten digital pockets numbered 0 through 9, and two special pockets 36 and 38, in that order. Each of these pockets is connected, in a manner described in detail in the aforementioned Hanstein patent application, with the magnetically controlled item transport chutes therein described and shown in part in the present FIG. 2, so that items can be transported and sorted at extremely high speeds, such as in the order of 400″ per second. Each pocket is provided with a warning light 37 indicating to the operator that the pocket is full. A centrally located start control button or bar 39 is disposed on the front of the cabinet 10 intermediate two emergency stop control buttons 41—41. Disposed on pedestals 42 on the top rear section of the cabinet is a storage rack 44 for temporarily storing items including thirteen separate relatively shallow item bins 46. The bins are slightly rearwardly inclined and angularly offset with respect to the top and bottom edges of the rack 44 to enable the operator to remove or replace stacks of items easily and quickly.

The item transport mechanism of the present apparatus is completely enclosed except for the receiving pockets, as shown in FIG. 1, so as to provide maximum safety to the operator and to exclude dirt, dust and foreign matter from the moving parts. In order to provide easy accessibility to the transport mechanism, especially when transported items become jammed in the chutes, there is provided an elongated movable cover or lid 48 over-lying this mechanism. The cover in the embodiment of the invention illustrated herein is divided into two sections as will be explained hereinafter and both together extend over the item transport mechanism from end to end of the cabinet. The cover 48 is pivotally mounted or hinged to the rear side of the cabinet for opening movement in a manner to be described shortly herein.

For the operator's convenience in handling and moving small bundles or pockets of items across the machine, a mobile carrier 50 supporting a detachable item tray 52 is movable along the entire length of the sorting machine. For this purpose the upper side of the cover member 48 is provided with a pair of parallel tracks 54 and 54′ mounted on the exposed surface of cover 48 and serving as rails for slidably guiding the tray. The present item handling apparatus is designed so that sheet items 56 such for example as bank checks, can be inserted in the feeder 16 while the apparatus is in operation, as is described in the copending applications for United States patents of Misbin et al., Serial No. 772,552, filed November 7, 1958, entitled "Sheet Stack Advance Mechanism," and of Solyst, Serial No. 781,729, filed December 19, 1958, entitled "Sheet Feeder," both of which are assigned to the assignee of the present invention.

Figure 2:
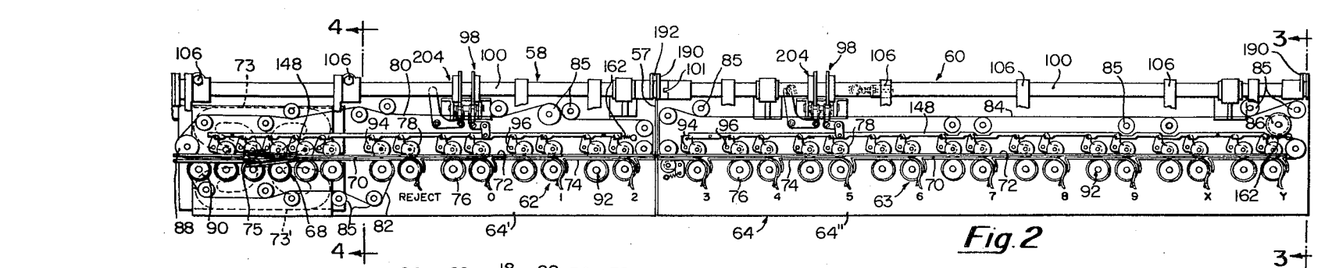
FIG. 2 is a top plan view of the item transport mechanism incorporated in the sorter apparatus of FIG. 1.

With reference to both FIGS. 1 and 2, it is seen that for convenience of fabrication, assembly, servicing, maintenance and moving of the machine, the machine may be divided vertically into two separate sub-assemblies or end sections, the dividing line being indicated at 57. In the illustrated embodiment of the invention, the divisional arrangement forms a four pocket end section generally indicated in FIG. 2 at 58 including the reject and the "0", "1" and "2" pockets, and a nine pocket end section generally indicated in the same figure at 60 including the remaining pockets. When connected together in the end to end relationship shown, the chute transport mechanism and other asociated operating elements of the two end sections of the machine function together as if the apparatus was initially integrally constructed. However, in this assembled condition the two sections of the cover 48 overlying the transport mechanism of the two end sections of the machine are independently movable on their respective hinge mountings for opening and closing movements. It should be understood that the two cover sections could be connected at their abutting ends for joint movement and thus a single cover member may extend completely over the chute transport mechanism.

The item transport mechanisms 62 and 63 in the end sections 58 and 60 respectively are supported on a main longitudinal frame generally indicated at 64 and constituted by individual longitudinal frame members 64′ and 64″ in the end sections 58 and 60 respectively. As previously mentioned, the two transport mechanisms are joined in the end to end relation to form one long mechanism. The chute forming mechanism 68 associated with the transport mechanism comprises in the illustrated embodiment two vertically spaced groups of elongated blades or vane members 70. The vanes of each group are disposed parallel to one another and extend lengthwise of the machine from the left end thereof below the control panel 18 and terminating separately in an individual pocket in each of the two sections. The vanes of each group are mounted between opposite side wall members extending approximately the length of the machine. The side walls for the upper group of vanes are identified at 72 and 74, as shown in FIG. 2, and in end and cross sectional views as FIGS. 3, 4 and 6, and the similar side walls for the lower group of vanes are identified at 72′ and 74′ in such views. The leading or throat forming ends of the vanes terminate in a free condition for sidewise movement in the area identified at 75 in FIG. 2 and between pairs of magnetic members 73 and 73′, shown in dotted outline at the left of FIG. 2. The magnetic fields provided by the magnetic members together with electromagnetic means, not shown, on each vane end serve to actuate the latter to form a throat and thus select a particular chute leading to a designated pocket, all as described and claimed in the above referred to Hanstein and Hebeler patent applications.

Rectangular shaped sheet items, such as bank checks, are preferably fed through the chutes lengthwise on one side of their longer edges and with their opposite lengthwise margins in the two groups of chute forming blades. Upon reaching the area adjacent its designated pocket each item is turned out of its normal straight line path of movement, FIG. 2, into its assigned pocket and aligned therein by means such as described and claimed in two copending United States patent applications of John G. Smith for "Document Handling Apparatus", Serial No. 773,592, filed November 13, 1958; and "Item Handling Apparatus", Serial No. 798,744, filed March 11, 1959, both of which are assigned to the same assignee as the present invention.

Disposed in the slot between the upper and lower sets of side wall members 72—74 and 72'—74' are a plurality of confronting pairs of pressure rollers 76 and 78. These rollers frictionally engage portions of endless drive belts 80, 82 and 84. Endless drive belt 80 serves to drive the rollers of the end section 58 of the machine, and it is assisted in the throat area 75 of the transport chutes by endless drive belt 82 on the other side thereof. Endless drive belt 84 serves to drive the rollers associated with the end section 60 of the machine. The drive belts, as shown, pass between adjacent pairs of rollers 76 and 78 in the slot between the two groups of chute vanes and around idler and tensioning rollers 85. Each drive belt is moved in one direction by means of an individual drive pulley, belt 84 by pulley 86, belt 80 by pulley 88, and belt 82 by pulley 90. Each drive pulley is rotated in a conventional manner by a drive motor, one such being shown at 91 in FIG. 3, for driving pulley 86. As seen more clearly in FIG. 8, each pair of confronting rollers 76—78 are of unequal size. The larger diameter rollers 76 are rotatably supported on a short hollow pedestal or shaft 92 fixed to a portion of the frame member 64. The smaller diameter pressure rollers 78 are each rotatably mounted on an L-shaped angle arm or bell crank 94 pivotally mounted on pins 96 secured to the frame member, the operating function of which will be more fully described hereinafter.

By means of cam release mechanism generally indicated at 98 (FIGS. 2 and 5), one of which is disposed intermediate the ends of each of the pocket sections 58 and 60, and in a manner to be described in detail later on, the smaller pressure rollers 78 may be retracted from the larger rollers 76, thereby enabling the release of any item or items which may have become wedged or jammed along the item transport path.

Figure 3:
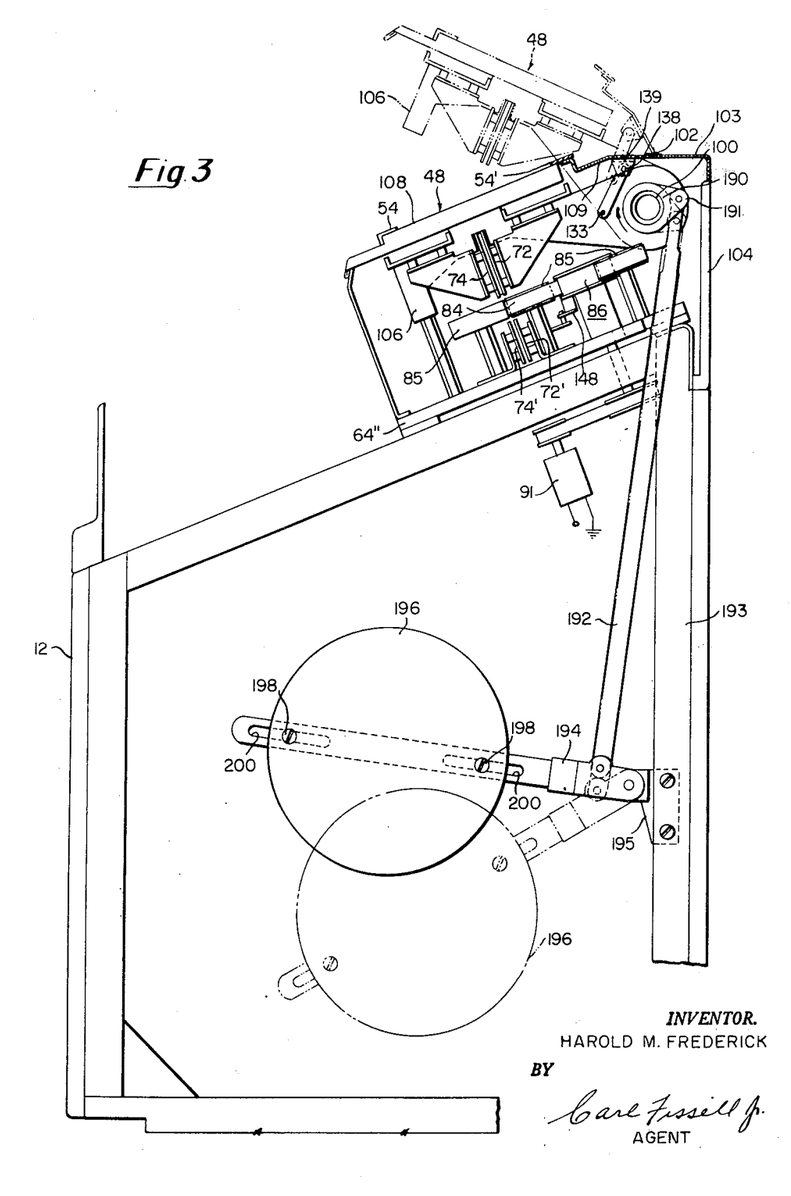
FIG. 3 is a right-hand side elevational view taken along line 3—3 of the transport mechanism of FIG. 2 and illustrating in dotted outline the raised open position of the cover and associated group of transport blades.
Figure 4:
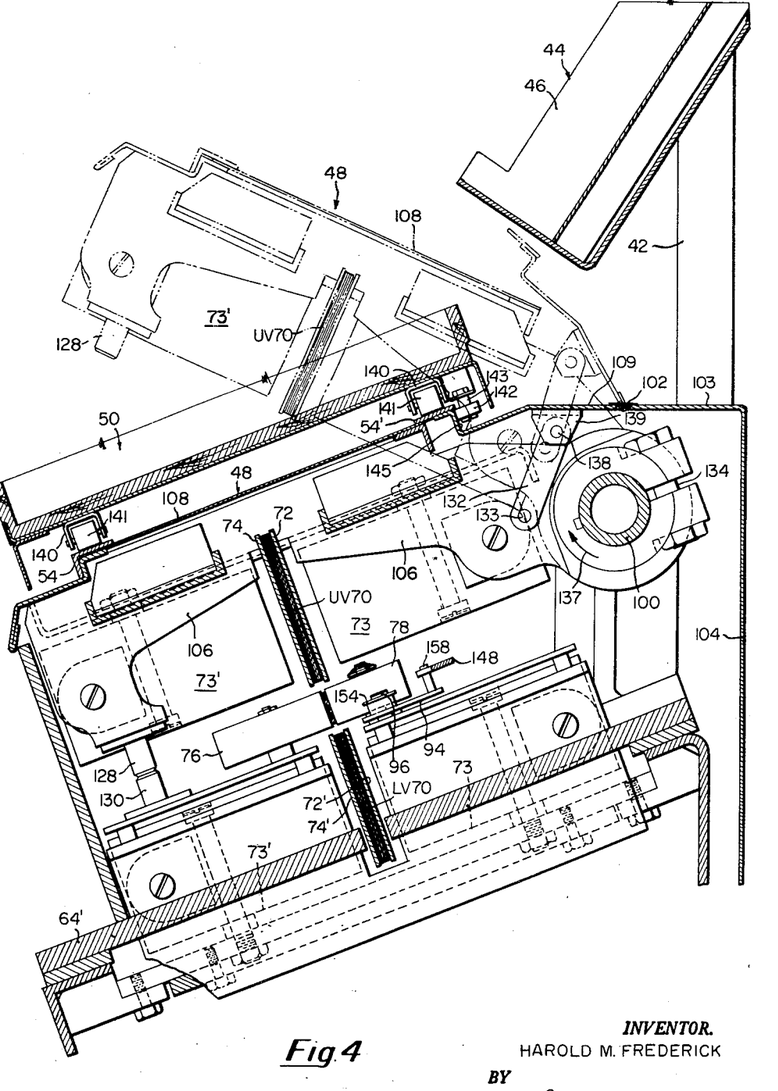
FIG. 4 is a vertical sectional view of the item transport mechanism taken along line 4—4 of FIG. 2 and similar to FIG. 3 illustrating in dotted outline the open position of the cover and associated group of transport blades.
Figure 6:
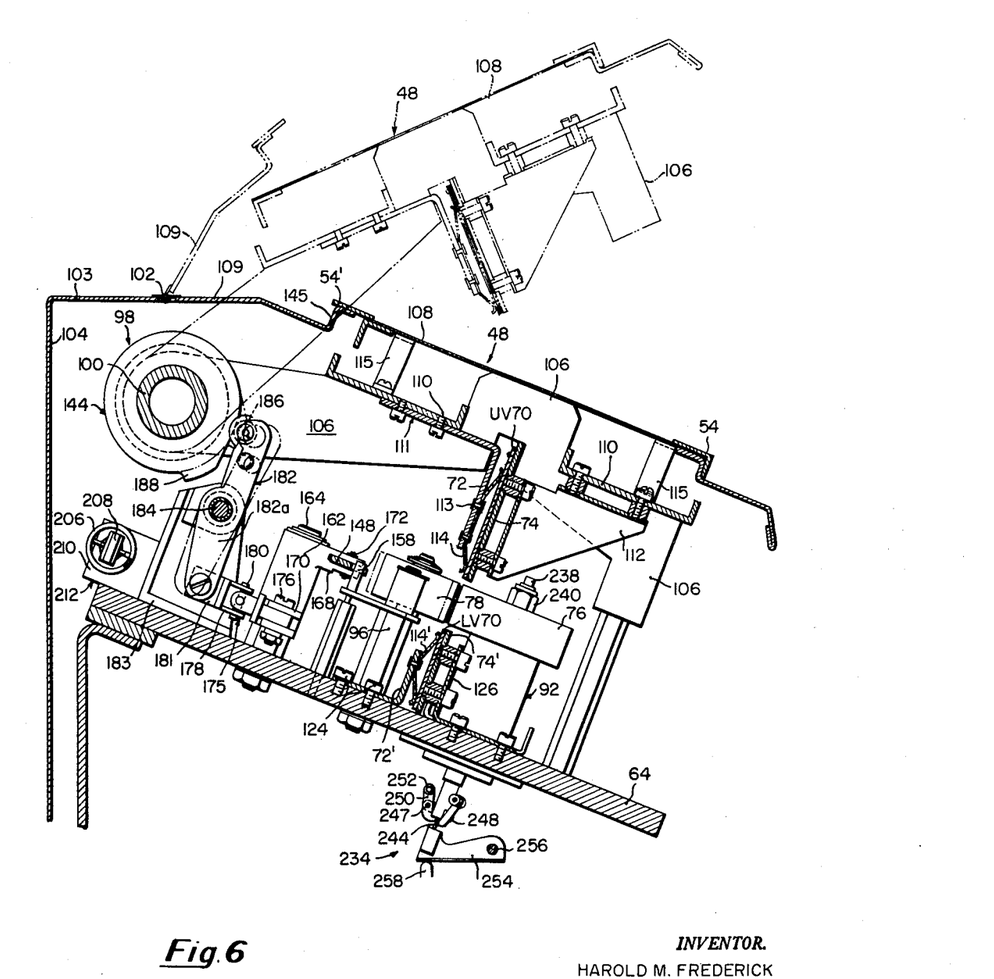
FIG. 6 is a vertical sectional view taken along line 6—6 of FIG. 5 and illustrating in dotted outline the open position of the cover and associated group of transport blades.

Situated at the upper rear of the base 10 is an elongated two-part tubular shaft 100 suitably journalled for rotation and joined by coupling 101. The shaft extends from one end of the transport mechanism to the other. The cover member 48 comprises, as shown in the enlarged cross sectional view of FIGS. 3 and 4, forward and rearward portions 108 and 109 respectively. As shown in FIGS. 3, 4 and 6 an elongated piano type hinge 102 pivotally mounts the rearward portion 109 of each of the two sections of the cover 48 to a stationary shelf 103 formed by a forwardly bent portion of rear wall 104 of the cabinet. The forward portion 108 of the cover member 48 is carried by the shaft 100 as will now be described. Located at suitable intervals along the shaft 100 are a number of forwardly projecting supporting arms 106 which carry on their outer ends the forward portion 108 of the cover 48. Arms 106 are secured to a pair of lengthwise extending channel members 110—110, the latter being demountably secured to lid portion 108 by means of brackets 115 which are or may be attached at one end as by welding to portion 108 and are secured as by bolts at the other end to channel member 110.

As set forth in more detail in the Hanstein application earlier mentioned herein, the chute forming vanes 70 of the illustrated embodiment of the invention are formed of two spaced parallel groups of vanes herein identified as the upper and lower sets UV70 and LV70 respectively, FIGS. 4 and 6. The vanes of the upper set UV70 are mounted between the pair of parallel side wall forming members 72 and 74 which are secured to the under side of the channel members 110—110. As shown in FIG. 6, wall member 72 may be provided with a flange 111 bolted to the inner channel member 110 or gussets 112 may be employed for securing the wall members 72 and 74 to the inner and outer channel members 110 respectively, as shown in FIG. 3. It may be desirable, in some instances, for the two sets of vanes to be yieldably pressed together into a stacked face to face relationship against the upper and lower wall members 74 and 74' respectively as by means of spring leaves 114–114' each attached to its respective companion wall member 72 and 72', for example, by rivets 113, as shown in FIG. 6. The gussets 112 also serve to rigidify the wall 74 in a manner resisting the horizontal thrust of the vanes UV70 as they are opened slightly or sidewise separated when items are transported therebetween during sorting or other handling operations.

Figures 7, 8, 9:
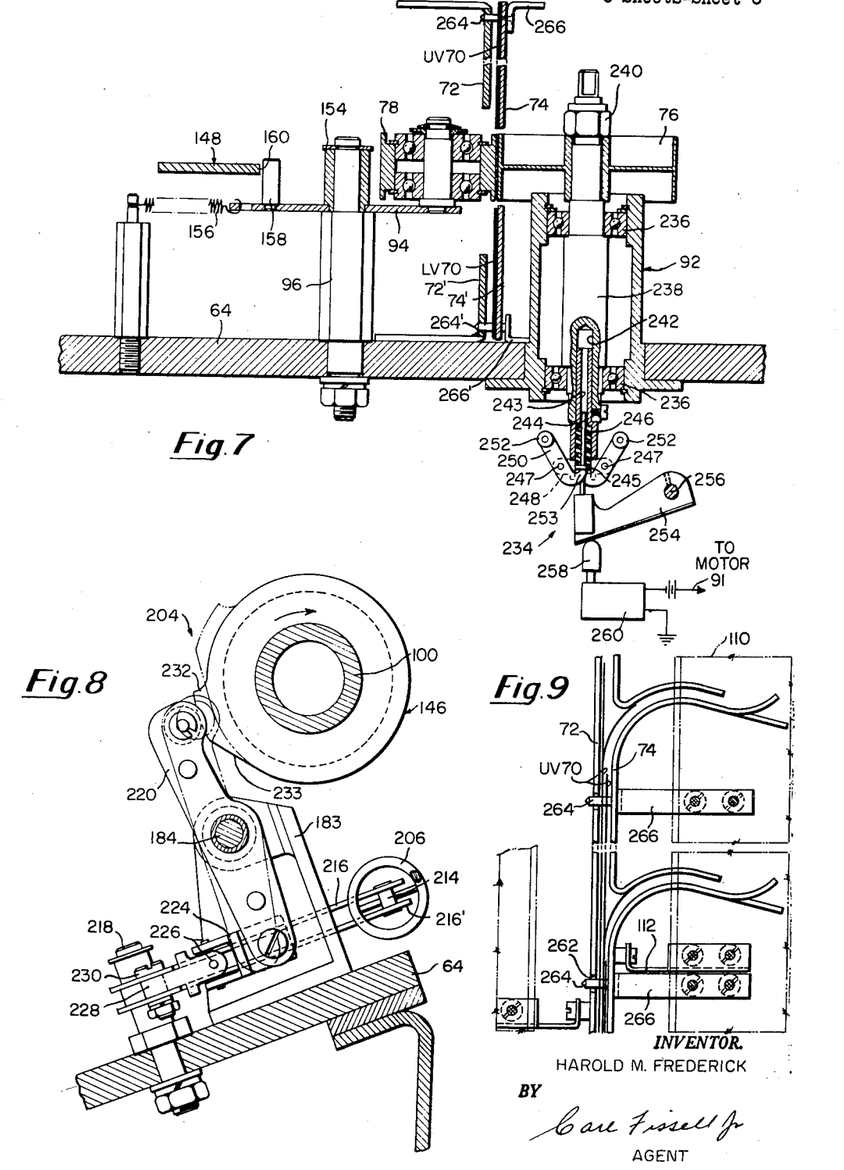
FIG. 7 is a detail sectional view taken along line 7—7 of FIG. 5.
FIG. 8 is a detail sectional view taken along 8—8 of FIG. 5.
FIG. 9 is a top plan view of a portion of the upper chute blade or vane assembly illustrating the means by which the vanes are supported.

In the illustrated embodiment of the invention the vanes UV70—LV70 are each provided with a plurality of openings or perforations, as shown most clearly in FIG. 9, disposed at varying intervals throughout their extent and located along the upper marginal portion of the vanes UV70 and the lower marginal portion of the vanes LV70 so as to prevent interference with the items moving therebetween. The vanes of each group are supported throughout their length by means of a plurality of projections or pins 264—264' (upper and lower respectively) extending through the vane perforations and across the passageway between the wall members 72—74 and 72'—74'. Preferably, each pin extends from an L-shaped supporting bracket 266—266' located on the outer side of the wall members 74 and 74' through the latter and into oversize openings 262 in the opposite wall member. The blades are loosely received over the pins 264.

Each L-shaped vane supporting bracket 266 for the upper tier of vanes is secured to the underside of the outer channel member 110 attached to lid portion 108, by any suitable means such as bolts, for example. In this manner the vanes of each group are permitted a limited degree of sidewise movement and thus may undulate slightly throughout their lengths during the passage of items therebetween. Also, by the provision of the pins 264 for the upper tier of vanes, these vanes are caused to be carried with the wall member 74 when the latter is moved during the raising and lowering of the cover portion 108. The mounting of the pins 264—264' on separate brackets enables these brackets and pins to be removed from the machine and thus provides a convenient way of removing the chute blades for replacement without disturbing or requiring removal of the wall members 72—72' and 74—74'.

The lower set of vanes LV70, FIG. 6, is mounted in similar fashion as the upper vanes UV70 except that the lower vanes and the wall forming members 72' and 74' are slightly narrower in width. The member 72' formed as an angle bracket is secured to the frame 64 by means of bolts 124. Likewise the wall member 74' is secured to the upstanding portion of an angle bracket 126, the latter being bolted to frame 64. Members 128—130 as shown in FIG. 4 provide means for spacing the upper set of vanes from the lower set of vanes.

Referring now to FIG. 4, it will be seen that the two part cover 48—forward and rearward parts 108 and 109 respectively—also carries a link 132 pivotally mounted at one end 133 on the right hand portion of member 106 the latter being secured to shaft 100 by means of the bolt 134. The opposite end of link 132 is pivotally secured as at 138 on yoke member 139 fixed to the underside of rear cover member 109. As the forward portion 108 of lid 48 is elevated, manually in this case, shaft 100 rotates clockwise in the direction of its arrow 137 causing the link 132 to move from its full line position to its broken line position, thus elevating the rearward portion 109 of the cover relative to portion 108, as shown. It will be understood that cover member 109, because of the location of hinge 102 relative to pivot 138, will move upwardly independently of cover member 108 and at a faster rate of speed thus to move out of the way of cover member 108 during its opening movement. The cover has been so constructed in order to simplify the hinging problem caused by the location of shaft 100 beneath shelf 103. This mechanism permits the forward portion 108 of the cover carrying the upper vanes UV70 to move arcuately upwardly without interference from the cabinet structure.

The mobile carrier 50, on lid 48, FIG. 4, comprises a shallow rectangular box-like member for carrying the item tray 52, FIG. 1. At each of the four corner portions on the underside of carrier 50 there is provided a U-shaped member 140 mounting a roller 141 on which the tray is movable over the tracks 54 and 54'. Since the work surface of the apparatus is slanted downwardly toward the operator area as before mentioned, carrier 50 is prevented from falling forward by means of a pair of hanger rollers 142, only one of which is visible in FIG. 4. These rollers are carried on a stud 143 which is attached to the bottom rear portion of the carrier 50 in a manner such that the periphery of each of the rollers contacts the stepped rear side 145 of the cover member 109.

Occasionally, for one reason or the other, items become jammed in the transport chutes and must be removed. For ease of removal it is desirable to hold all of the items in the lower vanes LV70 rather than having some of them retained in and dangling from the upper vanes UV70 when the latter are in their raised position. To this end apparatus described and claimed in the aforesaid Palasciano application, Serial No. 816,005 and now to be described is effective to clamp the items within the lower vanes during the first portion of the pivotal movement of cover 48 i.e., until the upper vanes are out of contact with the items, while the last portion of the cover movement is effective to release the items for easy removal by hand.

Figure 5:
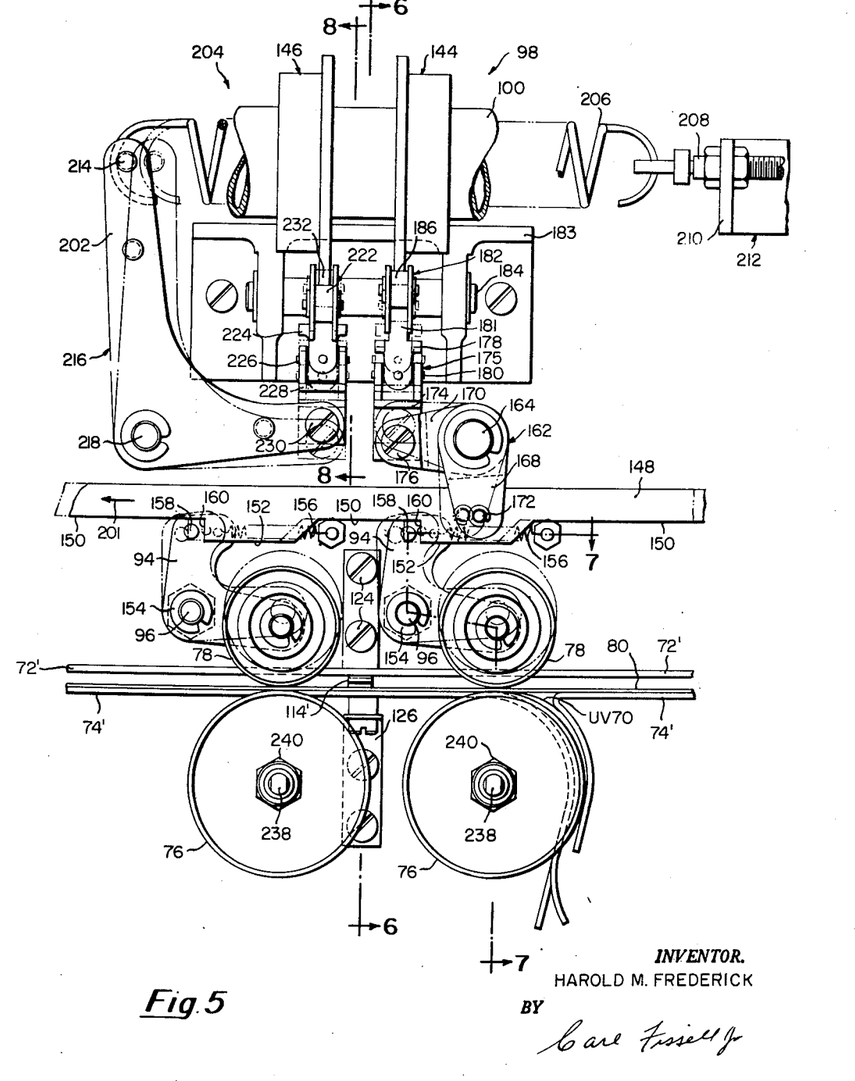
FIG. 5 is an enlarged top view of a portion of the item transport mechanism of FIG. 2 illustrating the item jam release apparatus.

Referring to FIGS. 2, 5 and 6, and, more particularly to FIG. 5, there is shown a pair of cams 144 and 146 secured to and movable with shaft 100. An item pressure roller actuating member comprising an elongated rigid bar 148 having a plurality of notches 150 and projections 152 along one edge portion thereof, is provided for each of the pocket sections 58 and 60, as shown most clearly in FIG. 2. As described above, individual bell cranks 94, pivoted to frame 64 by pins 96, carry the item pressure rollers 78 at one end thereof. Split washers 154 lock the cranks 94 to the pins 96. The opposite end of each crank 94 is provided with an upstanding projection or pin 158 positioned in the path of movement of edge 160 of the projection 152 on actuator 148. Each bell crank 94 is biased clockwise, about its pivot 96 by means of a spring 156 secured at one end to the frame, and at its opposite end to the end of the bell crank adjacent a respective pin 158.

In the foregoing manner the smaller diameter rollers 78 are constantly peripherally engaged with one surface of the drive belts 80 or 84, as the case may be. Each drive belt is in turn pressed against the opposite peripheral surface of each of the larger diameter rollers 76. Thus when the drive belts are moving, the pressure rollers are caused to rotate. Any item entrained between the upper and lower sets of vanes UV70 and LV70 is carried along by the belts and the confronting pairs of pressure rollers.

Disposed between the actuator 148 and the shaft 100 is an operating linkage for releasably engaging and disengaging the pressure rollers 78 from the rollers 76 so as to permit items which may have become jammed therebetween to be removed. Means for driving the actuator member 148 is provided by the crank member 162 pivotally mounted on the frame 64 by means of a stud shaft 164 to which it is suitably secured by C-ring 166. Crank member 162 is provided with upper and lower bifurcated arms or extensions 168 and 170, respectively (FIG. 6), extending from member 162 approximately 90° apart. Actuator bar 148 passes through the bifurcated end of upper extension 168 and is pivotally secured thereto by a pin 172.

The bifurcated end section of the lower extension 170 straddles and is pivotally secured to one end of a link 174 by a pin 176. The other end of link 174 forms one section of a universal joint 175, the other section of which is formed by oppositely disposed parallel arms of a second link 178, both sections being connected together by cross pins 180, see FIG. 6. The arm 181 on the other end of link 178 is pivotally connected to and between the lower ends of the parallel arms 182a of a vertically disposed cam follower arm 182, see FIGS. 5 and 6. The follower arm is rockably mounted in a cradle 183 on a horizontal shaft 184, the ends of which are journalled in the cradle walls. Carried between the upper ends of the follower arm 182 is a follower roller 186 which is urged against the periphery of cam 144 and adapted to engage and be moved by the cam protuberance or lobe 188 (FIG. 6) whenever the lid 48 is moved from the full to the dotted line position shown in FIG. 6.

Referring to FIG. 3, it can be seen that shaft 100 is provided at its extreme outer end with a hub member 190 having an extension 191 to which is atached to an elongated link 192 pivotally secured at its opposite end to a counter-weight arm 194, which in turn is pivoted to a bracket 195 on a rear vertical supoprt member 193 of base 10. A counter-weight in the form of a disc 196 is secured to and adjustably positionable along the counter-weight arm 194 by means of bolts 198 and slots 200 in the arm. A second substantially similar counter-weight arrangement, although not shown herein, is disposed at the opposite end of shaft 100.

Thus it is seen that when the lid or cover 48 is raised by the operator, shaft 100 is rotated clockwise with the help of the weight of disc 196 so that the lid 48 as well as the disc moves from the full line position to the broken line position, as shown. As shaft 100 rotates, the lobe 188 on cam 144 is rotated counter-clockwise, as seen in FIG. 6, from its full line position, to the broken line position. This motion of the cam causes the lobe 188 to move under and rock the follower arm 182 about shaft 184 in a clockwise direction causing the lower portion of the arm to drag links 178 and 174 leftwardly thus to rotate arm 170 (FIG. 5) and member 162 about shaft 164. Simultaneously, upper extension 168 of member 162 is rotated in a clockwise direction, as seen in FIG. 5, from its full to its broken line position, moving actuating member 148 to the left in the direction of arrow 201 and against the tension of springs 156. The leftward edge 160 of each of the projections 152 thus engage respective studs 158 on bell cranks 94. Further movement of actuator 148 as cam 144 rotates with shaft 100, rotates bell crank 94 in a counterclockwise direction thus to retract pressure rollers 78 away from the respective drive belts and rollers 76 to free any items jammed therebetween.

Still referring to FIG. 5 of the drawings, it can be seen that as the actuator members 148 of each of the two item pocket sections are moved leftwardly against the tension of the springs 156, a torque or counter force is developed due to the stretching of the springs. In order to offset or counter-balance this torque build up, a counter-balance mechanism 204, FIG. 5, is utilized, as now will be described.

Disposed below and parallel to shaft 100 is a relatively stiff coil spring 206, one end of which is secured to an adjusting turnbuckle 208, which latter member is mounted to the upturned ear 210 of a supporting member 212 secured to the frame 64. The opposite end of the spring 206 is detachably mounted over a stud 214 disposed between the ends of the longer arms 202 of bell cranks 216—216' (see FIG. 8) pivotally mounted on the frame 64 by means of a short shaft 218. A cam follower arm 220 substantially identical to arm 182 and having a follower roller 222 rotatably mounted at one end thereof, is pivoted for vertical rocking movement about shaft 184.

The depending end of the arm 220, as seen in FIG. 8, is movably mounted to link 224 which is coupled by cross pins 226 to a second link 228 in the manner of a universal joint. The rightward end of bell crank 216, as seen in FIG. 5, is pinned to one end of link 228 by bolt 230.

As shaft 100 is rotated during raising of lid 48, cam 146 is rotated therewith causing the cam follower 222 to move off the top of the lobe 232, as seen in FIG. 8, to the slope 233. Movement of roller 222 down the slope under the strong pressure of spring 206 effects a turning movement to be exerted against the cam in the direction of the arrow (on the cams) sufficient to counterbalance the force of springs 156. At the completion of the raising of lid 48, cam 146 and follower 220 is in the broken line position indicated in this figure, and the spring force is cancelled out against shaft 100. Return of lid 48 to its closed position returns this counter-balance mechanism to its full line condition with roller 222 on top of lobe 232 ready for the next opening of the lid.

In order to quickly and easily detect an item jam in the transport mechanism and shut down the apparatus, a plurality of control means are provided throughout the aforedescribed transport mechanism. These means are exemplified herein by the jam detection control mechanism 234, shown most clearly in FIGS. 6 and 7. Referring first to FIG. 7, it is seen that each hollow pedestal or shaft 92 is provided at each end with a bearing member 236 rotatably supporting roller shaft 238. Roller 76 is secured to one end of shaft 236 for rotation therewith by means of the nut 240. The opposite end of shaft 238 is hollowed axially for a short distance to provide a cylindrical recess or chamber 242 into which a sleeve 243 is secured by means of a screw. A plunger member 244 is slidably received within sleeve 243. A spring 246 is positioned in the lower end of sleeve 243 with one end against an offset or shoulder intermediate the ends of the sleeve and its other end against a flange 245 on the plunger 244 thus to bias the plunger downwardly from the sleeve. Pivotally mounted as at 247 to outrigger members or tabs 248 integral with the lower end of sleeve 243 are individual arms 250 each having a weight 252 attached to its outer end and in the manner of a "fly-ball governor." The opposite end 253 of each arm 250 is hook shaped and, as shown in FIG. 7, rests against the under side of plunger flange 245.

In its normal condition, spring 246 presses the lower end of plunger 244 into engagement with the end of an actuator arm 254 fixed to a shaft 256 extending from end to end of the item transport mechanism. It is understood, of course, that the shaft is in multiple parts, for convenience of insertion in each pocket section. An actuator 254 is located beneath each roller supporting pedestal 92.

As shown in FIG. 7, the "governor" mechanism is in its inoperative condition, that is, the transport mechanism is not operating. In this condition, plunger 244 is in its lowermost position with its lower end having rotated actuator 254 downwardly to open the normally closed switch 260 positioned beneath the actuator. The switch is electrically connected in circuit with a source of power and the apparatus drive motors such as shown at 91, FIG. 3, and in a manner such that when switch 260 is electrically "opened" as will be described hereinafter, the drive motors are stopped, halting operation of the item transport drive mechanism. Closure of one of the "start" switches electrically overrides the open switch 260 and the transport mechanism moves to normal operating speed which is sufficient to cause the weighted ends of arms 250 to move outwardly and downwardly thus to raise plunger 244 permitting switch 260 to close and override the now open starting switch.

While more than one switch 260 may be provided for each pocket section of the machine, it is only necessary to provide one for each section. Rotation of shaft 256 by any one of the arms 254 will effect actuation of the switch.

In operation of the present apparatus when an item jam is detected by the means hereinbefore described, the machine is automatically shut off. The operator can then move the lid from its normally closed position in which the members 128 and 130, FIG. 4 are in abutting relationship and the upper set of magnets and vanes are disposed in close proximity to the lower set of magnets and chute blades to its raised position in which the upper magnets and blades are angularly separated from their lower counterparts. Any operational difficiencies along the transport path are thus made visible in short order. In addition to the foregoing, since the lid together with all its attached accoutrements is counter weighted by means of the discs 196, the operator is required to exert relatively little effort to affect the raising and lowering of the apparatus lid or cover.

From the above it is seen that the present invention provides novel mechanism for handling and transporting sheet items, wherein item jams are quickly detected and the machine shut down, and wherein the operator is able immediately and easily to locate and remove any jammed items.

What is claimed is:

1. Sheet item handling means comprising, a first and a second group of elongated flat item chute forming blades, the blades of each group being arranged in parallel face to face relationship with the ends of the blades terminating freely together in the same area and the opposite ends terminating successively in separate item stacker pockets, said groups of blades being spaced apart from each other in edge alignment, means adjacent to said common free ends of said blades for controlling the movement of the blade ends selectively to open a particular chute leading to a selected pocket, and closure means for said first and said second groups of blades and movable from a closed to an open position and return, a portion of said controlling means together with said first group of blades being carried by said closure means and being jointly movable therewith for further separating the two groups of blades.

2. Sheet item handling apparatus comprising, a first and second group of elongated flat item chute forming blades, the blades of each group being arranged in parallel face to face relationship with the ends of the blades terminating freely together in the same area, the terminal portion of the opposite ends being arcuately curved away from the plane of the blades whereby each blade terminates successively in a separate item stacker pocket, said groups of blades being vertically spaced apart from each other in edge alignment, means adjacent to said common free ends of said blades for controlling the movement of the blade ends selectively to open a particular chute leading to a selected pocket, and closure means overlying said first and second groups of blades and movable from a closed to an open position and return, a portion of said controlling means together with said first group of blades being suspended from and movable with the closure means.

3. Item handling apparatus comprising, a supporting base, a first group of elongated flat chute forming blades disposed in said base, said blades being arranged in parallel face to face relationship with the ends of the blades terminating together in the same area and their opposite ends terminating successively in separate item stacker pockets, a second group of elongated flat chute forming blades substantially similar to said first group of blades, said two groups of blades being vertically disposed in parallel edge alignment with one another, an elongated cover member extending from end to end of said base over said two groups of chute forming blades, means mounting said cover member on said base for pivotal movement toward and away from the base, means securing the upper group of blades to the underside of said cover member whereby movement of said cover member in opening direction carries the upper group of blades therewith and away from the lower group of blades.

4. Sheet item handling apparatus comprising, in combination, an upper set of vanes and a lower set of vanes, said upper and lower sets of vanes being coextensive and parallel and disposed in spaced apart edge alignment and forming throughout their length a plurality of sheet item pathways each terminating at one end in a separate sheet item receiving pocket, an upper and a lower pair of magnetic members disposed at the opposite respective ends of said vanes in confronting polar arrangement, the last mentioned vane ends extending between said pairs of magnetic members and being free to move sidewise therebetween under the influence of the fields of the magnetic members to thereby open a pathway for feeding sheet items therealong to its respective pocket, and a movable member extending from end to end of said sets of vanes, and means securing one of said sets of vanes to said member for joint movement therewith whereby upon movement of the member in one direction it will carry one of the sets of vanes further away from the other set of vanes.

5. Sheet item handling apparatus comprising, a base, means on said base supporting a plurality of sheet item chute forming blades, said blades being disposed in parallel side by side relationship, with the ends of the blades terminating freely together in a common area to form chute entrances, the other end of each blade terminating individually at a separate item stacker pocket, magnetic means positioned on opposite sides of the free ends of said blades, said magnetic members being adapted to assist in the movement of the free ends of the blades with which they are associated to open a selected chute leading to a particular pocket, a support member disposed substantially from end to end of said blades and mounted on said base, an elongated closure member coextensive with said blades and said support member, means mounting said blades and said magnetic means positioned to said closure member, and means movably securing said closure member to said support member whereby when said closure member is moved in one direction said blades are moved away from said base.

6. Sheet item handling apparatus comprising, a first group of elongated flat chute forming blades, a second similar group of blades, the blades of each group being arranged in parallel face to face relationship, with the ends of the blades terminating freely together in a common area to form chute entrances, the other end of each blade terminating individually at a separate item stacker pocket, said two groups of blades being substantially equally spaced apart throughout their length in edge alignment, a first pair of magnets, a second pair of magnets, means positioning said first pair of magnets on opposite sides of the free ends of the first group of blades, means positioning said second pair of magnets on the opposite sides of the free ends of the second group of blades, each said pair of magnets being adapted to move the free ends of the blade groups with which it is associated to open a selected chute leading to a particular pocket, and an elongated cover member coextensive with said blades and said pairs of magnets, said first group of blades and said first pair of magnets being attached to and movable with said cover member whereby when said cover member is moved in one direction said groups of blades are separated from one another to provide an access opening therebetween.

7. Sheet item handling apparatus comprising, in combination, a base, an upper set of vanes, a lower set of vanes fixed relative to said base, means for biasing the vanes of each of said upper and lower set of vanes into a compact parallel side by side assembly, said upper and lower sets of vanes being coextensive and parallel and disposed in spaced apart edge alignment and forming throughout their length a plurality of sheet item pathways each terminating at one end in a separate sheet item receiving pocket, an upper and a lower pair of magnetic members disposed at the other respective ends of said vanes in confronting polar arrangement, said last mentioned vane ends extending between said pairs of magnetic members and being free to move sidewise therebetween under the influence of the fields of the magnetic members to thereby open a pathway for feeding a sheet item therealong to its respective pocket, and a movable member supported on said base and extending from end to end of said sets of vanes supported on said base, means for securing one of said sets of vanes supported on said base to said member for joint movement therewith whereby upon movement of the member the set of vanes secured thereto is moved away from the other set of vanes.

8. The construction in accordance with claim 7 wherein said biasing means comprises one or more spring blade members the opposite ends of which engage and press against the upper and lower side edge portions of said vanes.

9. Sheet item handling apparatus comprising, a first group of elongated flat chute forming blades, a second similar group of blades, the blades of each group being arranged in parallel face to face relationship, with the ends of the blades terminating freely together in a common area to form chute entrances, the terminal portion of the opposite end of each blade being acutely angled with respect to the remainder of the blade and terminating individually at a separate stacker pocket, said two groups of blades being substantially equally spaced apart throughout their length in edge alignment, a first pair of magnets, a second pair of magnets, means positioning said first pair of magnets on opposite sides of the free ends of the first group of blades, means positioning said second pair of magnets on the opposite sides of the free ends of the second group of blades, each said pair of magnets being adapted to move the free ends of the blade groups with which it is associated to open a selected chute leading to a particular pocket, and an elongated cover member coextensive with said blades and said pairs of magnets, said first group of blades and said first pair of magnets being attached to and movable with said cover member whereby when said cover member is moved in one direction said groups of blades are separated from one another to provide an access opening therebetween.

10. Item handling apparatus comprising, in combination, a supporting structure including upright vertically disposed members and horizontally interconnected members together forming a rectangularly shaped cabinet, an elongated closure member extending substantially from end to end of said cabinet, means pivotally mounting said closure member to the upper portion of said cabinet, a first set of parallel chute forming guide members disposed in said cabinet, a second set of parallel chute forming guide members normally extending in parallel spaced apart relationship to said first set of guide members, and means securing said second set of chute forming guide members to the closure member whereby upon pivotal movement of the latter the second set of guide members is moved away from the first set of guide members.

11. Document sorting apparatus comprising, in combination, a supporting structure forming a cabinet, a first lower set of parallel extending chute forming guide blades in the cabinet and extending substantially horizontally, a second similar upper set of parallel extending chute forming guide blades positioned above said first set and extending in juxtaposition thereto and together therewith forming selectible pathways for transporting documents, a cover member overlying said upper set of chute forming blades, means securing the cover member to the cabinet for upward movement, and means securing said upper set of chute forming blades to the cover member such that upon upward movement thereof the upper set of blades is moved away from the lower set of blades in order to provide access to the document transporting pathways.

References Cited in the file of this patent

UNITED STATES PATENTS

| | | |
|---|---|---|
| 1,922,188 | Zworykin | Aug. 15, 1933 |
| 1,983,342 | Chambers | Dec. 4, 1934 |
| 2,784,851 | Bretschneider | Mar. 12, 1957 |

FOREIGN PATENTS

| | | |
|---|---|---|
| 581,377 | Canada | Aug. 11, 1959 |

UNITED STATES PATENT OFFICE
CERTIFICATE OF CORRECTION

Patent No. 3,067,886　　　　　　　　　　　　December 11, 1962

Harold M. Frederick

It is hereby certified that error appears in the above numbered patent requiring correction and that the said Letters Patent should read as corrected below.

Column 3, line 28, for "blank" read -- bank --; column 8, line 26, for "supoprt" read -- support --; column 12, line 13, strike out "supported on said base"; lines 14 and 15, strike out "supported on said base".

Signed and sealed this 29th day of October 1963.

(SEAL)
Attest:
ERNEST W. SWIDER

Attesting Officer

EDWIN L. REYNOLDS

Acting Commissioner of Patents